(12) United States Patent
Christiansen

(10) Patent No.: US 8,300,244 B2
(45) Date of Patent: Oct. 30, 2012

(54) AUTOMATIC DISCOVERY OF NETWORKED RASTER IMAGE PROCESSING ENGINES

(75) Inventor: Robert Douglas Christiansen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3371 days.

(21) Appl. No.: 10/417,949

(22) Filed: Apr. 16, 2003

(65) Prior Publication Data

US 2004/0207863 A1    Oct. 21, 2004

(51) Int. Cl.
G06K 15/00 (2006.01)
G06F 15/16 (2006.01)
G06F 11/00 (2006.01)

(52) U.S. Cl. ............ 358/1.15; 358/1.12; 358/1.13; 358/1.14; 358/1.16; 358/1.9; 358/501; 358/502; 358/426.15; 358/426.16; 709/219; 709/220; 709/230; 709/245; 709/250; 714/11; 714/15; 714/701

(58) Field of Classification Search .......... 358/1.15, 358/1.16, 1.9, 1.1, 1.13, 1.14, 501, 504, 401, 358/426.03, 426.05, 426.11, 1.12, 1.17, 502, 358/1.7; 710/16; 709/224, 223, 219; 370/254, 370/256; 369/47.14
See application file for complete search history.

(56) References Cited

U.S. PATENT DOCUMENTS

| | | | | |
|---|---|---|---|---|
| 5,014,221 A * | 5/1991 | Mogul | .......... | 358/1.14 |
| 5,113,494 A * | 5/1992 | Menendez et al. | ........... | 345/502 |
| 5,577,172 A * | 11/1996 | Vatland et al. | ............... | 358/1.15 |
| 5,835,720 A * | 11/1998 | Nelson et al. | ................. | 709/224 |
| 5,964,156 A * | 10/1999 | Smith et al. | ................... | 101/471 |
| 6,449,053 B2 * | 9/2002 | Bando | .......... | 358/1.15 |
| 6,711,998 B2 * | 3/2004 | Hashimoto | ................ | 101/129 |
| 7,009,941 B1 * | 3/2006 | Uchino | ........... | 370/254 |
| 7,187,461 B2 * | 3/2007 | Schlonski et al. | ........... | 358/1.15 |
| 7,218,408 B2 * | 5/2007 | Toyofuku | .................... | 358/1.15 |
| 2002/0105675 A1 * | 8/2002 | Toyofuku | .................... | 358/1.15 |
| 2002/0196463 A1 * | 12/2002 | Schlonski et al. | ........... | 358/1.15 |
| 2004/0179218 A1 * | 9/2004 | Wissenbach | ................ | 358/1.13 |

* cited by examiner

Primary Examiner — Steven Kau

(57) ABSTRACT

Systems and methods for automatic discovery of a networked raster image process (RIP) engine are described. In one aspect, a device determines that an entity is searching for one or more RIP engines. Responsive to such determining, the device notifies the entity of its RIP engine status.

24 Claims, 3 Drawing Sheets

AUTOMATIC DISCOVERY OF NETWORKED RASTER IMAGE PROCESSING ENGINES

TECHNICAL FIELD

The invention relates to the management of network printing resources.

BACKGROUND

Raster image processing (RIP'ing) is the process of translating digital vector image data into bit-mapped image data or raster bits for rendering. Such vector image data is generally expressed in a Page Description Language (PDL) such as Printer Control Language® (PCL), Portable Document Format (PDF), or PostScript® (PS). In the printing field, one or more hardware and/or software implemented raster image process (RIP) engines are commonly used by print shops to RIP large print jobs or documents for printing on a printing press. When one or more RIP resources, which may be implemented across any number of computing devices, are configured to work on a particular print job the RIP resources can be collectively referred to as a pipeline.

When setting up a RIP management system to control some number of the RIP engines in a networked printing environment, an administrative entity must have beforehand knowledge of the particular RIP engines that are to be managed. Such beforehand knowledge is used to manually enter networking information, such as respective networked RIP engine internet addresses, etc., into the RIP management system. Without such manual configuration techniques, existing RIP management systems would not be able to communicate with and utilize networked RIP engines.

Such manual configuration of RIP management system is problematic. For example, manual configuration of a RIP management system is not only time consuming and labor intensive, but it is also error prone and subject to implementation delays that may not meet the often-changing workflow needs of a print shop. Techniques to overcome these limitations of existing RIP management system configuration techniques are greatly desired.

SUMMARY

Systems and methods for automatic discovery of a networked raster image process (RIP) engine are described. In one aspect, a device determines that an entity is searching for one or more RIP engines. Responsive to such determining, the device notifies the entity of its RIP engine status.

BRIEF DESCRIPTION OF THE DRAWINGS

The detailed description is described with reference to the accompanying figures.

DETAILED DESCRIPTION

Figure 1:
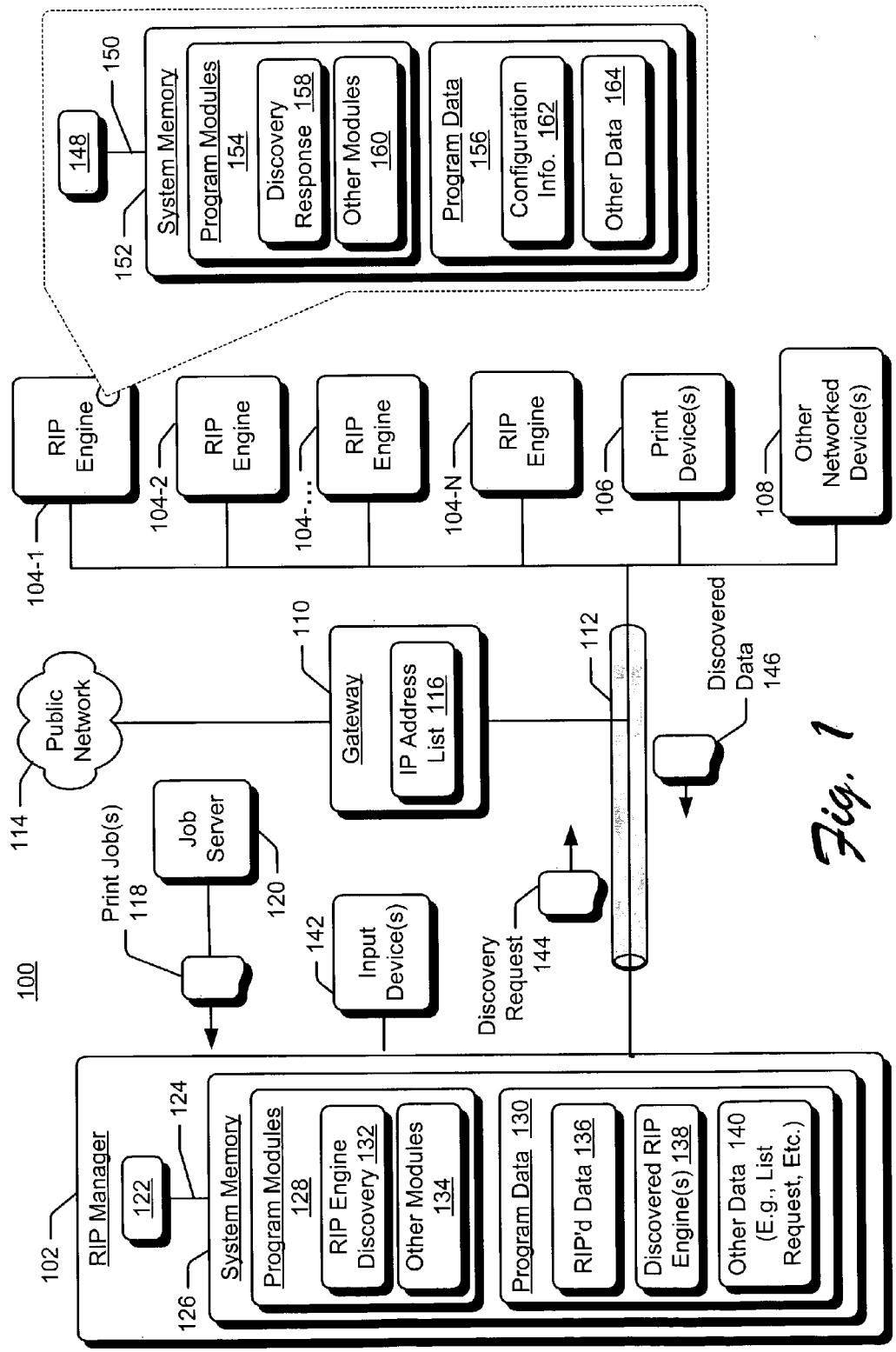
FIG. 1 is an exemplary suitable computing environment within which automatic discovery of networked RIP engines may be implemented.

Turning to the drawings, wherein like reference numerals refer to like elements, the invention is illustrated as being implemented in a suitable computing environment. FIG. 1 is an exemplary suitable computing environment 100 within which systems, apparatuses and methods to automatically discover networked RIP engines may be implemented. Exemplary computing environment 100 is only one example of a suitable computing environment and is not intended to suggest any limitation as to the scope of use or functionality of systems and methods the described herein.

Although not required, the invention will be described in the general context of computer-executable instructions, such as program modules executed in a distributed computing environment by a computer. Program modules generally include routines, programs, objects, components, data structures, etc., that perform particular tasks or implement particular abstract data types. In a distributed computing environment, program modules may be located in both local and remote memory storage devices.

As shown in FIG. 1, the exemplary computing environment 100 includes RIP manager 102, one or more RIP engines 104-1 through 104-N, one or more print device(s) 106, and zero (0) or more other networked devices 108 such as personal computers and/or the like. In this implementation, each of these components is coupled to gateway 110 over communication path 112. The gateway represents a network management system such as a gateway, router, or other network server such as DNS, WINS, SNMP, or just a basic file listing networked device information. For purposes of this implementation, the communication path represents any type of physical or wireless network communication infrastructure deployed in an Intranet. It can be appreciated that the systems and methods of this written description can be extended beyond an Intranet and across other network configurations such as across the Internet. The gateway device 110 serves not only as an access point to and possibly from a public network 114 such as the Internet, but also maintains an IP address list 116 for internal communications between components within the Intranet. Such an IP address list is typically encapsulated in a network address translation table maintained by the gateway.

The RIP manager 102 receives print jobs 118 from a job server 120. The print jobs include, for example, print data that is to be rendered onto a printing device 106. However, since print data is typically expressed in a Page Design Language (PDL) and vector image data, the print data must be transcoded into bitmapped data before being printed on the print device. To this end, the RIP manager provides the print data in one or more partitions to respective ones of one or more RIP engines 104-1 through 104-N for raster image processing (RIP'ing). Partition distribution may be based on any number of different criteria such as RIP engine availability, partition size, current and/or anticipated print shop workflow, and so on. Once the print data has been raster image processed (RIP'd) by respective ones of the RIP engines, the RIP'd data, which is now in bitmap form, is communicated to the print device for printing.

Before the RIP manager 102 can distribute portions of the print job 118 to one or more RIP engines 104-1 through 104-N for RIP'ing, the RIP manager must be configured to communicate with respective ones of the one or more RIP engines via their corresponding internet protocol (IP) addresses. Recall that existing techniques require manual entry of RIP engine IP addresses into a RIP management system before the system can manage and otherwise communicate with the RIP engines.

In contrast to such existing techniques, the RIP manager 102 automatically discovers RIP engines 104-1 through 104-N IP addresses without need for any manual administrative intervention. The RIP manager uses these automatically discovered IP addresses to direct each portion of a print job to one or more of the RIP engines. Since the RIP manager automatically discovers RIP engine configuration data, the systems and methods of the exemplary computing environment 100 solve the time consuming and labor intensive problems associated with existing techniques that require manual configuration if RIP engine IP addresses into a management system.

To automatically discover networked RIP engines 104-1 through 104-N, the RIP manager includes, for example, a processor 122 coupled across a bus 124 to a system memory 126. The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

System memory 126 includes a variety of computer readable media. Such media may be any available media that is accessible by RIP manager 102, and it includes both volatile and non-volatile media, removable and non-removable media. In particular, the system memory includes computer-readable media in the form non-volatile memory, such as read-only memory (ROM), and/or volatile memory, such as random access memory (RAM). The RIP manager may further include other removable/non-removable, volatile/non-volatile computer storage media (not shown) such as a hard disk drive, a CD-ROM, a magnetic tape drive, and so on.

The RAM portion of the system memory 126 contains program modules 128 and program data 130 that are immediately accessible to and/or presently being operated on by the processor 122. For instance, the program modules include RIP engine discovery module 132 and other modules 134 such as an operating system (OS) to provide a runtime environment, a RIP resource pipeline configuration routine, and/or the like. The program data includes, for example, RIP'd data 136, discovered RIP engine information 138, and other data 140 such as configuration data, and/or the like.

A user may provide commands and information into the RIP manager 102 through one or more input devices 142 such as a keyboard and pointing device such as a "mouse". Other input devices may include a microphone, joystick, game pad, satellite dish, serial port, scanner, camera, etc. These and other input devices are connected to the processing unit 122 through an input interface (not shown) coupled to the 124, but may be connected by other interface and bus structures, such as a parallel port, game port, universal serial bus (USB), or Firewire (IEEE 1394). Optionally, the RIP manager may also be coupled to a monitor (not shown).

The RIP engine discovery module 132 sends an IP address list request to the gateway 110 to direct the gateway to send IP address list 116 to the RIP manager. Such a request is represented as the list request in "other data" 140 of FIG. 1. Recall that the IP address list includes all of the IP addresses of each computing device that is coupled to the Intranet network 112.

Subsequent to receiving the IP address list 116 from the gateway 110, the RIP engine discovery module communicates a respective discovery request 144 to each IP address in the IP address list. For example, in one implementation, the RIP engine discovery module iteratively sends a respective discovery request to each address in the IP address table from the lowest address first, the next higher address second, and so on, until all computing devices that are coupled to the network 112 have been sent a respective discovery request. In one implementation, the RIP engine discovery module does not send a discovery request to itself.

When a RIP engine 104 (i.e., one of the RIP engines 104-1 through 104-N) receives a message, the RIP engine evaluates the message to determine whether the message is a discovery request 144 from an entity searching for one or more RIP engines. In this implementation, the entity is the RIP manager 102. However, the entity could also be a different computing device that is searching for RIP engines on behalf of the RIP manager. In light of this, the RIP engine notifies the RIP manager of its status as a RIP engine by returning a respective discovered data packet 146, which is hereinafter also often referred to as a "discovery response". Responsive to receiving the discovery response, the RIP engine discovery module 132 knows at least that a particular IP address (the one from which the discovery response was received) is mapped to a RIP engine. This mapping is stored in discovered RIP engine(s) file 138. The discovery response 146 may contain additional information as well, for example, a machine name that can be used in a name server lookup operation, available computing resource (e.g., processing and/or memory resources), and/or the like. This additional information can be used by the RIP manager 102, for example, to arrange respective ones of the RIP engines into one or more pipelines to handle print shop workflow.

The RIP engine discovery module 132 waits a threshold amount of time before determining that all available (e.g., functioning) networked RIP engines have been discovered. Such a threshold amount of time can be represented by just about any number of different criteria such as a determination of how many other RIP engines have been discovered in a certain amount of time, current network data throughput statistics, and/or the like. For purposes of discussion, such a threshold and such threshold criteria are represented by "other data" 140. At this point, discovered RIP engine file 138 is provided to a network administrator, for example, configuration of one or more pipelines to process print job(s) 118.

To return a respective discovery data packet 146 to a RIP engine discovery module 132, each RIP engine respectively includes a processor 148 coupled across a bus 150 to system memory 152. The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

System memory 152 includes a variety of computer readable media. Such media may be any available media that is accessible by the processor 148, and it includes both volatile and non-volatile media, removable and non-removable media. In particular, the system memory includes computer-readable media in the form non-volatile memory, such as read-only memory (ROM), and/or volatile memory, such as random access memory (RAM). The RIP engine may further include other removable/non-removable, volatile/non-volatile computer storage media (not shown) such as a hard disk drive, a CD-ROM, a magnetic tape drive, and so on.

RAM portion of the system memory 152 contains program modules 154 and program data 156 that are immediately accessible to and/or presently being operated on by the processor 148. For instance, the program modules include discovery response module 158, and other and other modules 160 such as an operating system (OS) to provide a runtime environment, a RIP'ing module to RIP print data expressed in PDL to bitmapped data, and so on. The program data includes, for example, configuration information (info) 162 and other data such as PDL print data, RIP'd data, and so on.

Responsive to receiving a discovery request 144, the discovery response module 158 generates the contents of the discovery data packet 146 from the contents of configuration info 162. The configuration info includes, for example, a gateway assigned IP address, a machine name or alias, etc. Once generated, the discovery response module communicates the discovery data packet to the requesting RIP engine discovery module 132.

Other components such as the print device(s) 106 and the other networked device(s) 108 do nothing in response to receiving a discovery request, other than, perhaps, discard the request. In this manner, the cooperative components of the exemplary computing environment 100 automatically discover networked RIP engines. In one implementation, the print device 106 includes an embedded RIP engine which can also be discovered as described with respect to RIP engines 104-1 through 104-N.

Figure 2:
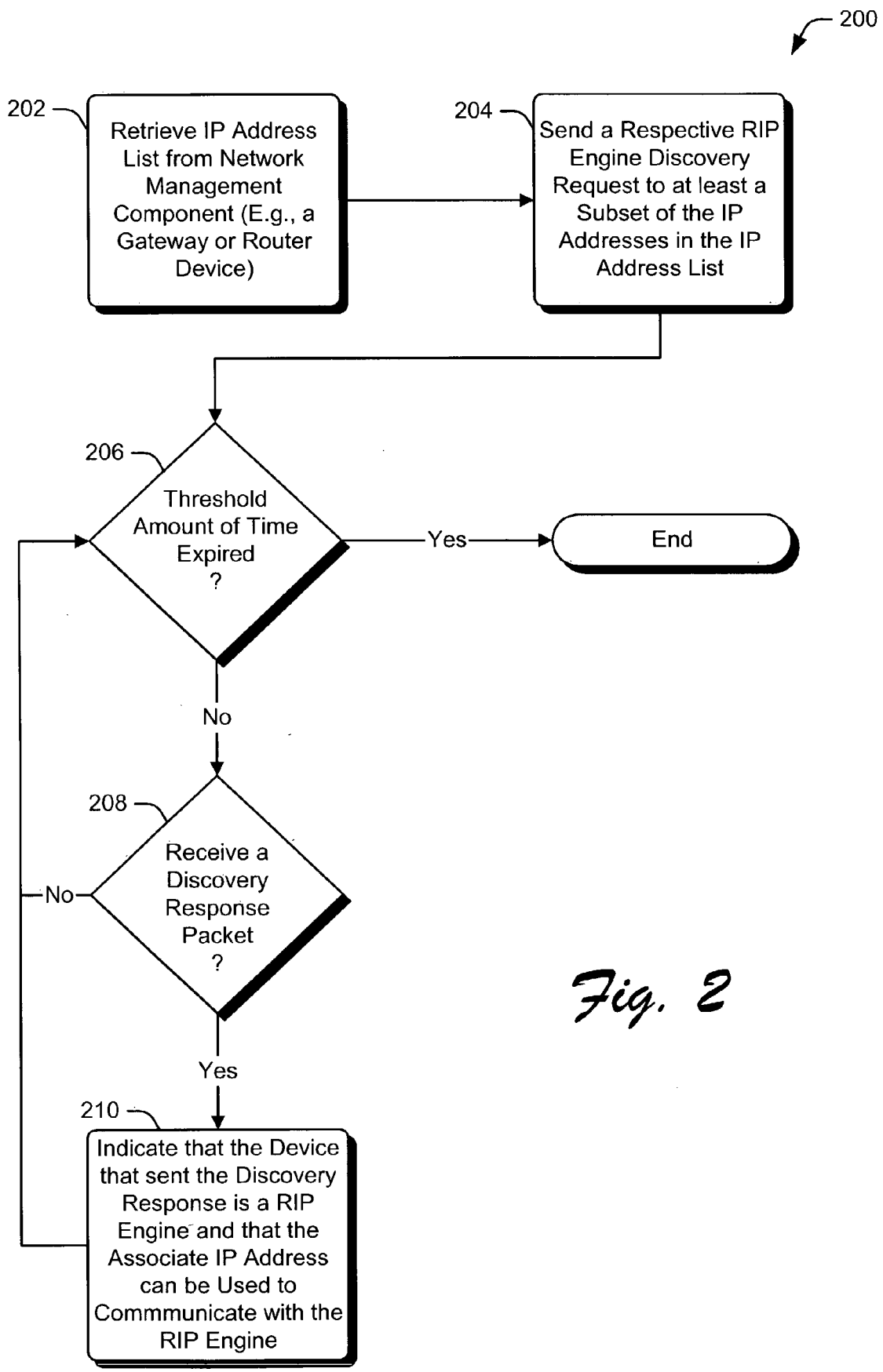
FIG. 2 shows an exemplary procedure to automatically discover a networked RIP engine.

FIG. 2 shows an exemplary procedure 200 for a RIP manager to automatically discover networked RIP engines. For purposes of discussion, the exemplary procedure is described in reference to features of FIG. 1. At block 202, the RIP engine discovery module 132 (FIG. 1) retrieves an IP address list 116 (FIG. 1) from the gateway 110 (FIG. 1). At block 204, the RIP engine discovery module sends a discovery request 144 (FIG. 1) to at least a subset (i.e., the RIP engine discovery module may not send one to itself or other devices that are already known to not be RIP engines) of the IP addresses in the IP address list. At block 206, the RIP engine discovery module determines if a threshold amount of time has elapsed since the discovery requests were sent to the at least a subset of IP addresses. Such a threshold can be based on any of numerous different criteria, for example, current network load, average RIP engine response time, and so on. If the threshold amount of time has expired, the procedure ends. It can be appreciated that at this point, a user could initiate another discovery scan with a larger or smaller threshold immediately after the first scan completes.

Otherwise, if the threshold amount of time has not expired, at block 208, the RIP engine discovery module 132 (FIG. 1) determines if a discovery response 146 (FIG. 1) has been received. If not, the procedure continues at block 206 as described above. However, if a discovery response has been received, at block 210, the RIP engine discovery module indicates that the IP address of the device that sent the discovery response is a particular one of the RIP engines 104-1 through 104-N (FIG. 1). This indication is stored in discovered RIP engine(s) file 138. At this point, the procedure continues at block 206 as described above.

Figure 3:
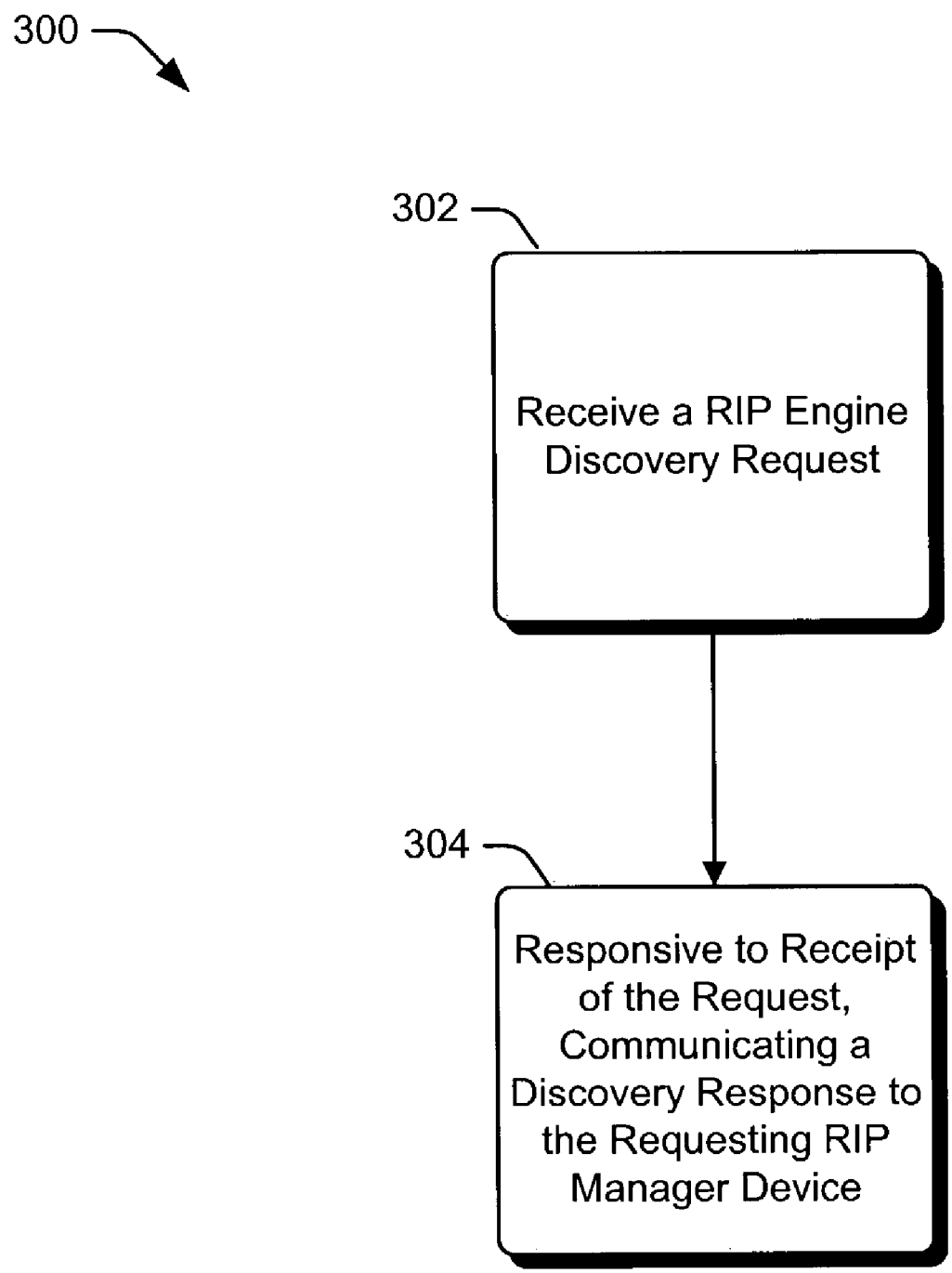
FIG. 3 shows further aspects of the exemplary procedure of FIG. 2 to automatically discover a networked RIP engine.

FIG. 3 shows an exemplary procedure 300 for a RIP engine to automatically respond to a RIP engine discovery request. For purposes of discussion, the exemplary procedure is described in reference to features of FIG. 1. At block 302, respective ones of RIP engines 104-1 through 104-N (FIG. 1) receive a RIP engine discovery request 144 (FIG. 1). The RIP engine discovery request was communicated to the respective ones by the RIP engine discovery module 132 (FIG. 1). At block 304, responsive to receiving a RIP engine discovery request, a RIP engine generates and communicates a discovery response 146 (FIG. 1) to the RIP engine discovery module. As noted above, a component that is not a RIP engine such as the print device(s) 106 (FIG. 1) and the other networked device(s) 108 (FIG. 1) do nothing in response to receiving such a discovery request, other than, perhaps, discard the request, unless a RIP engine was a component of that network device or print device.

Conclusion

The described systems and methods provide for automatic discovery of networked RIP engines. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. A method for automatic discovery of a networked raster image process (RIP) engine, the method comprising:
   determining, by a non-printing device, that an entity is searching for a plurality of RIP engines, the RIP engines separate from one or more printing devices and are adapted to translate digital vector image data of a print job into bitmapped image data or raster bits for printing of the print job by the printing devices, the non-printing device and the entity part of a networked system including a plurality of other devices including the RIP engines, the RIP engines greater in number than the printing devices, where such determining comprises the non-printing device receiving a RIP engine discovery request from the entity, the RIP engine discovery request denoting that the entity is inquiring whether the non-printing device is a RIP engine or not; responsive to the determining and responsive to receiving the RIP engine discovery request,
   where the non-printing device is one of the RIP engines, notifying the entity, by the non-printing device, that the non-printing device is a RIP engine; and,
   where the non-printing device is not one of the RIP engines, performing, by the non-printing device, an action other than notifying the entity that the non-printing device is a RIP engine.

2. A method as recited in claim 1, wherein notifying further comprises communicating a discovery response to the entity.

3. A method as recited in claim 2, wherein the discovery response comprises a machine name of the RIP engine.

4. A method as recited in claim 2, wherein the discovery response comprises an indication of the available computing resources of the RIP engine.

5. The method of claim 1, wherein performing an action other than notifying the entity that the device is a RIP engine comprises discarding a discovery request sent by the entity without responding to the discovery request.

6. A tangible computer-readable storage medium for automatic discovery of a plurality of networked raster image process (RIP) engines, the tangible computer-readable storage medium storing computer-program instructions executable by a processor coupled to a non-printing device for:
   receiving, by the non-printing device, a RIP engine discovery request from a RIP manager, the non-printing device and the RIP manager part of a networked system including a plurality of other devices including the RIP engines, the RIP engine discovery request denoting that the RIP manager is inquiring whether the non-printing device is a RIP engine or not;
   responsive to receiving the RIP engine discovery request, if the non-printing device is a RIP engine, communicating by the non-printing device a discovery response to the RIP manager, the discovery response indicating to the RIP manager that the non-printing device is a RIP engine and that an IP address used to send the RIP engine discovery request to the non-printing device can be used to communicate with the RIP engine; and, if the non-printing device is not a RIP engine, performing, by the non-printing device, an action other than notifying the RIP manager that the device is a RIP engine, wherein the RIP engines are separate from one or more printing devices and are adapted to translate digital vector image data of at least a portion of a print job into bitmapped image data or raster bits for printing of the print job by the printing devices, the RIP engines greater in number than the printing devices.

7. A computer-readable medium as recited in claim 6, wherein the discovery response comprises a machine name of the RIP engine.

8. A computer-readable medium as recited in claim 6, wherein the discovery response comprises as indication of the available resources of the RIP engine.

9. A non-printing computing device for automatic discovery of a plurality of networked raster image process (RIP) engines, the non-printing computing device comprising:
a processor; and
a memory coupled to the processor, the memory comprising computer-program instructions executable by the processor for:
evaluating, by the non-printing computing device, a message received from a different device, the non-printing computing device and the different device part of a networked system including a plurality of other devices including the RIP engines;
determining that the message is a RIP engine discovery request, the RIP engine discovery request denoting that the different device is inquiring whether the computing device is a RIP engine or not; and
responsive to the determining and responsive to the RIP engine discovery request,
where the non-printing computing device is one of the RIP engines, communicating a discovery response to the different device, the discovery response indicating to the different device that the computing device is a RIP engine and that an IP address used to send the message to the computing device is used to communicate with the computing device;
where the non-printing computing device is not one of the RIP engines, performing an action other than notifying the different device that the computing device is a RIP engine,
wherein the RIP engines are separate from one or more printing devices and are adapted to translate digital vector image data of at least a portion of a print job into bitmapped image data or raster bits for printing of the print job by the printing devices, the RIP engines greater in number than the printing devices.

10. A computing device as recited in claim 9, wherein the different device is a RIP manager.

11. A computing device as recited in claim 9, wherein the message comprises a machine name of the RIP engine.

12. A computing device as recited in claim 9, wherein the message comprises an indication of the available computing resources of the device.

13. A method for automatic discovery of a plurality of networked raster image process (RIP) engines, the method comprising:
requesting an IP address list from a gateway;
in response to requesting the IP address list, receiving the IP address list from the gateway;
in response to receiving the IP address list from the gateway, communicating a RIP engine discovery request to at least a subset of addresses in the IP address list, a plurality of IP addresses within the subset of addresses associated with devices that are RIP engines and one or more IP addresses within the subset of addresses associated with devices other than RIP engines, the RIP engine discovery requests denoting that the method is inquiring whether the devices at the subset of addresses are each a RIP engine or not; and
responsive to receiving a discovery response from each device associated with one address of the at least a subset of addresses, indicating that the device is a RIP engine, the one address for communicating at least a portion of a print job to the RIP engine,
wherein the RIP engines are separate from one or more printing devices and are adapted to translate digital vector image data of at least a portion of a print job into bitmapped image data or raster bits for printing of the print job by the printing devices, the RIP engines greater in number than the printing devices.

14. A method as recited in claim 13, wherein the discovery response comprises a machine name of the RIP engine.

15. A method as recited in claim 13, wherein the discovery response comprises an indication of the available computing resources of the device.

16. A method as recited in claim 13, wherein the method further comprises:
specifying a threshold amount of time; and
waiting to receive a corresponding discovery response only if the threshold amount of time has not elapsed since communicating the RIP engine discovery request.

17. A tangible computer-readable storage medium for automatic discovery of a plurality of networked raster image process (RIP) engines, the tangible computer-readable storage medium storing computer-program instructions executable by a processor for:
requesting an IP address list from a gateway;
in response to requesting the IP address list, receiving the IP address list from the gateway;
in response to receiving the IP address list from the gateway, sending a RIP engine discovery request to at least a subset of addresses in the IP address list, a plurality of IP addresses within the subset of addresses associated with devices that are RIP engines and one or more IP addresses within the subset of addresses associated with devices other than RIP engines, the RIP engine discovery requests denoting that the method is inquiring whether the devices at the subset of addresses are each a RIP engine or not;
responsive to receiving a discovery response from each device associated with one address of the at least a subset of addresses, identifying the device as a RIP engine for communicating at least a portion of a print job to the RIP engine,
wherein the RIP engines are separate from one or more printing devices and are adapted to translate digital vector image data of at least a portion of a print job into bitmapped image data or raster bits for printing of the print job by the printing devices, the RIP engines greater in number than the printing devices.

18. A computer-readable medium as recited in claim 17, wherein the discovery response comprises a machine name of the RIP engine.

19. A computer-readable medium as recited in claim 17, wherein the discovery response comprises an indication of the available computing resources of the device.

20. A computer-readable medium as recited in claim 17, wherein the computer-program instructions further comprise instructions for:
   specifying one or more threshold criteria; and
   waiting to receive a corresponding discovery response only if the one or more threshold criteria have not been met.

21. A computing device for automatic discovery of a plurality of networked raster image process (RIP) engines, the computing device comprising:
   a processor; and
   a memory coupled to the processor, the memory comprising computer-program instructions executable by the processor for:
      requesting an IP address list from a gateway;
      in response to requesting the IP address list, receiving the IP address list from the gateway;
      in response to receiving the IP address list from the gateway, communicating a RIP engine discovery request to at least a subset of addresses in the IP address list, a plurality of IP addresses within the subset of addresses associated with devices that are RIP engines and one or more IP addresses within the subset of addresses associated with devices other than RIP engines, the RIP engine discovery requests denoting that the method is inquiring whether the devices at the subset of addresses are each a RIP engine or not;
      responsive to receiving a discovery response from each device associated with one address of the at least a subset of addresses, indicating that the device is a RIP engine, the one address for communicating at least a portion of a print job to the RIP engine,
   wherein the RIP engines are separate from one or more printing devices and are adapted to translate digital vector image data of at least a portion of a print job into bitmapped image data or raster bits for printing of the print job by the printing devices, the RIP engines greater in number than the printing devices.

22. A computing device as recited in claim 21, wherein the discovery response comprises a machine name of the RIP engine.

23. A computing device as recited in claim 21, wherein the discovery response comprises an indication of the available computing resources of the device.

24. A computing device as recited in claim 21, wherein the computer-program instructions further comprise instructions for:
   specifying a threshold amount of time; and
   waiting to receive a corresponding discovery response only if the threshold amount of time has not elapsed since communicating the RIP engine discovery request.

* * * * *